United States Patent Office 3,363,167
Patented Jan. 9, 1968

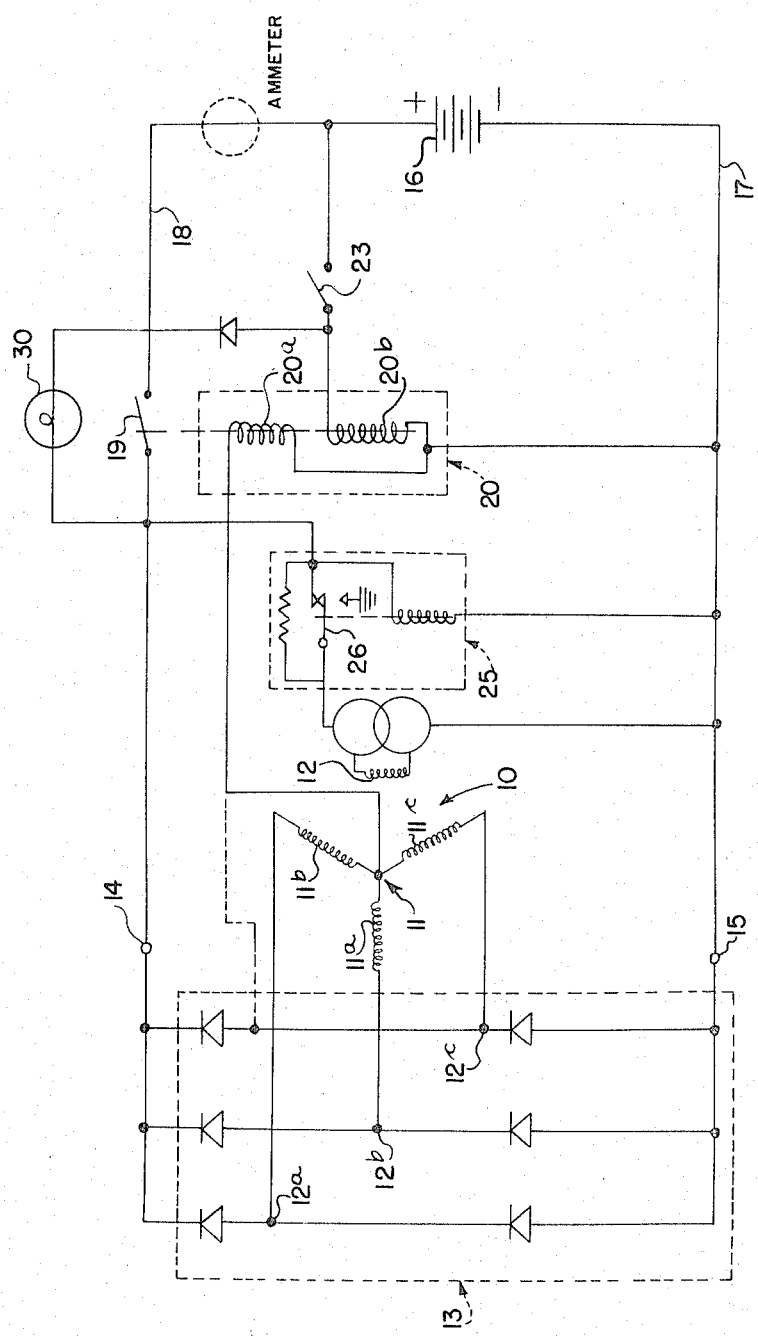

3,363,167
LOAD CIRCUIT CONTROL FOR GENERATING SYSTEM
Emery J. Szabo, Pepper Pike Village, and Thomas J. Dugan, Lakewood, Ohio, assignors to The Leece-Neville Company, Cleveland, Ohio, a corporation of Ohio
Filed June 4, 1964, Ser. No. 372,724
19 Claims. (Cl. 322—8)

ABSTRACT OF THE DISCLOSURE

The present system has an alternator rectifier unit for producing a unidirectional output voltage to energize a load which includes a vehicle battery. The contacts of a two-coil load relay are connected between the output of the alternator rectifier unit and the load. A first coil of this relay is connected to be energized solely in accordance with the output of the alternator rectifier unit. A second coil of the relay is connected to be energized by the battery when an ignition switch for the vehicle is closed. Both coils must be energized in additive relationship to pull in the relay. Therefore, the relay contacts will not close if the battery polarity is reversed. The load relay will drop out if the alternator fails. An indicator lamp shunts the load relay contacts.

The present invention relates to an electrical generating system and more particularly to a vehicle electrical generating system including an alternator rectifier unit and a load relay for connecting the alternator rectifier unit to a load including a battery.

In certain types of systems including batteries, particularly electrical systems for vehicles in which an alternator rectifier unit is to be connected to a load system including a battery, it is desirable to protect the electrical system against the battery being connected into the load system of the machine with reversed polarity as well as to provide means for effecting the connection of the generating machine to the battery and load system when the output voltage thereof is at a predetermined level and to disconnect the battery system when the voltage of the generating machine drops to or below the battery voltage. Load relays are commonly used to connect and disconnect a generating machine to a load system including a battery and it is desirable that the load relay and circuit be such that the relay under the normal conditions of operation need not break load currents. Moreover, a load relay is often desirable because it disconnects the battery from the generating machine on shutdown to remove battery potential from the output terminal of the machine.

Accordingly, the principal object of the present invention is to provide a new and improved electric system particularly for a motor vehicle, in which a load relay is provided for connecting a generating machine, such as an alternator rectifier unit, across a load system including a battery and in which the load relay operates to connect and disconnect the machine to the load system when the generated voltage thereof rises and falls to predetermined voltages, with the arrrangement being such that the load relay is not required to break load currents under normal operating procedures and operates to protect the electrical system when a battery is placed into the system with reversed polarity.

Another object of the present invention is to provide a new and improved vehicle electrical generating system as in the next preceding object which is compatible with a charge indicator light or an ammeter.

Another object of the present invention is to provide a new and improved electrical generating system, particularly one embodying an alternator rectifier unit and a load system including a battery in which a load relay has two actuating coils, one energized in accordance with the output voltage of the machine and one energized from the battery side of the circuit, the circuit being so arranged that it is necessary to energize both coils in aiding relationship to actuate the relay to connect the generating machine across the load system including the battery.

Yet another object of the present invention is to provide a new and improved generating system in which a generating machine, particularly an alternator rectifier unit, is connected to a load system including a battery by a load relay which has two operating coils, one responsive to the voltage of the generating machine and the other energized from a battery in the load system, when the latter is connected properly, to aid the coil energized by the machine, the circuit for energizing the voltage coil from the battery including switch contacts which are opened when the system is to be shut down and with the system being so arranged that both of the coils must be energized so as to aid each other in order to actuate the relay to connect the generating machine to the load system.

A further object of the present invention is to provide a new and improved electrical generating system including an alternator rectifier unit in which a load relay for connecting the alternator rectifier unit across a load system including a battery has a first voltage coil energized in accordance with the voltage of the alternator, and a second voltage coil energized from the battery in a direction to aid the first coil when the latter is of proper polarity through a circuit including switch contacts which are open when the system is to be shut down.

Further objects and advantages of the present invention will be apparent from the following detailed description of the preferred embodiment thereof made with reference to the accompanying drawing forming a part of the present specification for all matter disclosed therein and in which the sole figure is a circuit diagram of an electrical generating system embodying the present invention.

Referring to the drawing, the electrical generating system shown therein includes an alternator 10 having a three-phase armature winding 11 on the stator and a field winding 12 on the rotor of the machine. The phase windings of the armature are designated by the reference numerals 11a, 11b, 11c and these phase windings are connected to input terminals 12a, 12b, and 12c of a full wave rectifier 13 having output terminals 14 and 15. The output terminal 15 is connected to a load conductor 17 while the output terminal 14 is connected to a load conductor 18 through contacts 19 of a load relay 20. The contacts 19 are normally open contacts and are closed when the alternator rectifier unit comes up to voltages as will be described in more detail hereinafter to connect the alternator rectifier unit across the load conductors 17, 18 and, in turn, across the battery 16.

The load relay 20 has two voltage coils 20a, 20b for actuating the contacts 19. The voltage coils 20a, 20b are aiding coils and in accordance with the present invention both must be energized aidingly to pull in the relay 20. The voltage coil 20a is connected between the neutral point of the three-phase winding 11 and the output terminal 15 of the rectifier. Consequently, the coil 20a is energized in accordance with the alternating current voltage of the alternator 10 and the voltage across the coil will be a function of the output voltage of the alternator. Alternatively the coil 20a may be connected to an input terminal of the rectifier 13 as indicated by the dashed line in the drawing. Either connection will cause the coil 20a to be energized with pulsating unidirectional current which flows through one part of the rectifier 13.

The voltage coil 20b of the relay 20 is connected to the positive load conductor 18 and to the positive side of the battery 16, provided the latter is connected into the circuit properly, through switch contacts 23. The switch contacts 23 are preferably, in the case of a vehicle generating system, contacts which are operated with the ignition switch; or, in diesel types of vehicles, the switch may be part of the diesel run switch.

When the switch 23 is closed, load relay coil 20b will be energized from the battery with a current of a polarity which will cause coil 20b to aid coil 20a provided the battery is connected into the circuit with proper polarity. If the battery polarity is improper the coil will be energized with a current of a polarity which will cause coil 20b to oppose the action of coil 20a and the coil 20a will not be able to pull in the relay since it will not have the aiding effect of the coil 20b. A diode may be included in the circuit for energizing the coil 20b to limit the energization thereof to aiding polarity. It is important that an alternator rectifier unit be protected against reverse polarity since the rectifier would be a short circuit across the battery and the current drawn would destroy the rectifier or the wiring of the generating system.

After the starting of the engine driving the alternator 10 upon the closing of the contacts 23, the alternator voltage will build up and when the generated voltage has come up to a desired voltage the current through the coil 20b will aid the effect of coil 20a sufficiently to cause the relay contacts 19 to operate. Preferably the load relay closes at or below battery voltage. If the coil 20b is not energized or energized with a reverse polarity, the coil 20a will not operate the contacts 19, since the coil 20a is such that it develops insufficient power to pull in the relay at the maximum alternator potential unless it is aided by the coil 20b. In the illustrated embodiment the output of the alternator is shown as being regulated between maximum and minimum voltage levels by a conventional vibrating contact type regulator 25 having a voltage coil connected across the output terminals 14, 15 of the alternator rectifier unit and vibrating contacts 26 for connecting the field of the alternator to the output terminal 14.

Convenionally the dropout voltage of a relay is below the pull-in voltage. In the preferred embodiment the dropout voltage of the relay 20 and the effect of the coil 20a is such that the coil 20a will, by itself, hold in the relay 20 after the coil 20b is de-energized, until the energizing voltage for coil 20a drops to a value which indicates substantially no output from the alternator system. Consequently, the load relay is not required to break load currents, thereby preventing damage to the contacts 19.

The disclosed circuit is fully compatible with the use of either an ammeter or an indicator light when the system is a vehicle-generating system. As shown in FIG. 1, an indicating light, designated by the reference numeral 30, may be connected to a junction between the switch contacts 23 and the coil 20b and to the output terminal 14 of the rectifier. In certain cases it may be desirable to include a diode in the connection between the light and the junction aforementioned to prevent battery feedback back through the light to the ignition system when the switch contacts 23 are opened. The light will be lighted when the contacts 19 are opened to indicate that there is no output from the alternator rectifier unit. The current for energizing the light flows from the battery through the contacts 23 and the light and through the contacts 26 of the voltage regulator which will be closed when a low voltage exists across the terminals 14, 15 and through the field. This current for energizing the lamp also provides a bleed current for energizing the alternator field to aid the alternator to come up to voltage.

In the event that the alternator should fail after operation is started, the voltage of the alternator will drop and the loss of energization for the coil 20a will cause the load contacts 19 to open, even though coil 20b is energized, and the light to be lighted thereby indicating the failure of the alternator as well as protecting the system including the diodes of rectifier 13 when the alternator fails.

If an ammeter is to be used in lieu of an indicator lamp the ammeter may be placed in series with the load conductor and the battery between the battery and the contacts 19 of the relay 20 as indicated in dashed lines in the drawing.

From the foregoing it can now be seen that the present invention provides a new and improved electrical system in which a load relay protects the system against a reversed battery, operates to disconnect the load system from the alternator without breaking substantial load current under normal operating procedure and is compatible with both an indicator lamp and an ammeter type charge indicator.

While the preferred embodiment of the present invention has been described in considerable detail, it will be understood by those skilled in the art that future modifications, constructions and arrangements may be made which fall within the spirit and scope of the present invention.

What we claim is:

1. An electrical system including a generating machine having a unidirectional output to be connected to positive and negative load conductors for a load system including a battery, and a relay having normally open contacts and first and second coils adapted to cooperate in aiding relationship to each other to pull in said relay to close said contacts and connect the output of said machine to said load system when the generated voltage of said machine rises to a pre-determined magnitude, first circuit means for energizing said first coil independently of said contacts with a voltage dependent solely upon the generated voltage of the machine, and second circuit means effective to energize said second coil from said battery with said contacts open to aid said first coil to pull in said relay when said battery is connected into said circuit with its positive and negative terminals connected respectively to said positive and said negative load conductors, said first coil, at the maximum generated voltage of said generating machine, and said second coil being incapable of individually pulling in said relay, said relay having a drop-out voltage lower than its pull-in voltage and said first coil being effective to hold said relay in with said second coil de-energized until the generated voltage of said machine drops to at least about battery voltage.

2. An electrical system including a generating machine having a unidirectional output to be connected to positive and negative load conductors for a load system including a battery, and a relay having normally open contacts and first and second coils adapted to cooperate in aiding relationship to each other to pull in said relay to close said contacts and connect the output of said machine to said load system when the generated voltage of said machine rises to at least a predetermined magnitude where said generating machine is to be connected to a said load system, first circuit means for energizing said first coil solely from the potential generated by the machine, second circuit means effective to energize said second coil from said battery with said contacts ope in a direction to aid said first coil from said battery with its positive and negative terminals connected respectively to said positive and said negative load conductors, said first coil, at the maximum output voltage of said generating machine, and said second coil being incapable of individually pulling in said relay, a regulating circuit for said machine including a normally closed circuit for machine output voltages lower than a predetermined level, said circuit being connected across the unidirectional output of said machine on the machine side of said contacts, and a circuit including an indicator lamp shunting said contacts and connected to one of said load conductors and to said battery.

3. An electrical system including a generating machine having a undirectional output to be connected to positive and negative load conductors for a load system including a battery, and a relay having normally open contacts and first and second coils adapted to cooperate in aiding relationship to each other to pull in said relay to close said contacts and connect the output of said machine to said load system when the generated voltage of said machine rises to at least a predetermined magnitude when the output of said machine is to be connected to said load system, first circuit means for energizing said first coil with a voltage dependent only upon the generated voltage of the machine, second circuit means effective to energize said second coil from said battery with said contacts open to aid said first coil to pull in said relay when said battery is connected into said circuit with its positive and negative terminals connected respectively to said positive and negative load conductors, said first coil, at the maximum output voltage of said generating machine, and said second coil being incapable of individually pulling in said relay, said relay having a drop-out voltage lower than its pull-in voltage, said first coil being effective to hold said relay in until the voltage of said machine drops to at least about battery voltage when said second coil is de-energized, a regulating circuit for said machine including a normally closed circuit for machine output voltages lower than a pre-determined level, said circuit being connected across the output of said machine on the machine side of said contacts, and a circuit including an indicator lamp shunting said contacts and connected to one of said load conductors and to said battery.

4. An electrical generating system including an alternator having output connections and a rectifier having its input connected to said connections, load conductors connected to the output of said rectifier for connecting said rectifier to a load including a battery, a load relay having a set of normally open contacts in one of said load conductors for breaking the connections between said rectifier and said load, said relay having first and second actuating coils, first circuit means for energizing said first coil solely in accordance with the generated voltage of said alternator and providing sufficient power at generated voltages substantially at and above battery voltage to hold said relay in and insufficient power at the maximum alternator output voltage to pull in said relay, and second circuit means for energizing said second coil from the load side of said contacts to aid said first coil to pull in said relay when said battery is connected into the circuit with a predetermined polarity to effect the pull in of said relay when said generated voltage rises to a predetermined magnitude.

5. An electrical generating system including an alternator having output connections and a rectifier having its input connected to said connections, load conductors connected to the output of said rectifier for connecting said rectifier to a load including a battery, a load relay having normally open contacts in one of said load conductors for breaking the connections between said rectifier and said load, said relay having first and second actuating coils for said contacts, first circuit means for energizing said first coil solely in accordance with the generated voltage of said alternator and providing sufficient power at output voltages substantially at and above battery voltage to hold said relay in and insufficient power at the maximum alternator output voltage to pull in said relay, and second circuit means for energizing said second coil from the load side of said contacts to aid said first coil to pull in said relay when said battery is connected into the circuit with a predetermined polarity to effect the pull-in of said relay when said generated voltage rises to a predetermined magnitude, said second coil being incapable of pulling in said relay, said second circuit means including switch means for opening said second circuit means when said alternator is to be shut down.

6. An electrical generating system including an alternator having output connections and a rectifier having its input connected to said connections, load conductors connected to the output of said rectifier for connecting said rectifier to a load including a battery, a load relay having normally open contacts in one of said load conductors for breaking the connections between said rectifier and said load, said relay having first and second actuating coils for actuating said contacts, first circuit means for energizing said first coil solely in accordance with the generated voltage of said alternator and providing sufficient power at generated voltages substantially at and above battery voltage to hold said relay in and insufficient power at the maximum alternator output voltage to pull in said relay, and second circuit means for energizing said second coil from the load side of said contacts to aid said first coil to pull in said relay when said battery is connected into the circuit with a predetermined polarity to effect the pull in of said relay when said alternator voltage rises to a predetermined magnitude, said first circuit means including part of said rectifier effective to block current from said battery to said first coil.

7. An electrical system including an alternator rectifier unit, a load relay for connecting and disconnecting said unit from a load including a battery to be connected across the unit with a predetermined polarity, said relay having a pull in voltage and a dropout voltage lower than the pull in voltage, a first voltage coil for actuating said relay energized solely in accordance with the generated voltage of said alternator and developing sufficient power to hold in said relay until the generated voltage is at least substantially at or below battery voltage and having insufficient power at maximum generated voltage to pull in said relay, and a second actuating coil energized from said battery to aid said first coil when the polarity of the battery is proper to effect a pull in of said relay when the generated voltage of the alternator rises to a predetermined voltage, said second coil having insufficient power to hold in said relay with said first coil de-energized.

8. An electrical system including a generating machine having a unidirectional output to be connected to positive and negative load conductors for a load system including a battery, and a relay having normally open contacts and first and second coils adapted to cooperate in aiding relationship to each other to pull in said relay to close said contacts and connect the output of said machine to said load system when the generated voltage of said machine rises to a predetermined voltage, first circuit means for energizing said first coil with a voltage dependent solely upon the generated voltage of the machine, and second circuit means effective to energize said second coil from said battery with said contacts open to aid said first coil to pull in said relay when said battery is connected into said circuit with its positive and negative terminals connected respectively to said positive and said negative load conductors, said first coil, at the maximum generated voltage of said generating machine, and said second coil being incapable of individually pulling in said relay, said second circuit means including switch means operable to de-energize said second coil when said system is to be shut down.

9. An electrical system including a generating machine having an output voltage to be connected to a load system by a relay having a set of normally open contacts to be closed to effect the connection, a first coil energized solely in accordance with generated voltage to develop sufficient power to hold in said relay and maintain said contacts closed for generated voltages substantially at or above battery voltage and to drop out said relay at lower voltages, a second coil energizable independently of said generated voltage for aiding said first coil to pull in said relay and close said contacts, and means for selectively de-energizing said second coil.

10. An electrical generating system comprising a voltage generating machine having a unidirectional output for connection to an external direct current load circuit including a battery, a load relay having normally open contacts connected between the output of said machine and said load circuit, said load relay having first and second coils jointly controlling said contacts, means connecting said first coil to said machine independently of the battery for energization of the first coil by the machine independently of the condition of said contacts with a voltage dependent solely upon the output voltage of said machine and independent of the battery voltage, and means independent of the machine output for selectively connecting said battery to said second coil to supply battery current to said second coil of a polarity effective to maintain said contacts open when the battery is connected in the load circuit with reversed polarity.

11. A system according to claim 10 wherein said first and second coils are the only electrically energizable elements of the load relay controlling the closing and opening of said contacts.

12. A system according to claim 11 wherein said relay has a drop-out voltage lower than its pull in voltage, and said first coil is effective to hold said contacts closed with said second coil de-energized until the output voltage of said machine drops to at least about the battery voltage.

13. A system according to claim 11 wherein said second coil is energized by battery current, when the battery is connected in said load circuit with the correct polarity, insufficiently to maintain said contacts closed when said first coil is de-energized.

14. A system according to claim 10 wherein said means for selectively connecting said second coil to the battery includes switch means for disconnecting the second coil from the battery when said machine is to be shut down.

15. A system according to claim 14 wherein said switch means comprises contacts of a switch for a vehicle motor driving the voltage generating machine.

16. A system according to claim 10 wherein said voltage generating machine is an alternator-rectifier unit.

17. A system according to claim 16 wherein said alternator-rectifier unit includes rectifier means connected to prevent the battery from energizing said first coil when the battery is connected in the load circuit with proper polarity.

18. A system according to claim 10 and further comprising an indicator lamp shunting said contacts between the output of said machine and the battery.

19. A system according to claim 10 and further comprising a regulator for said machine including a normally-closed circuit for machine output voltages lower than a predetermined level, said normally-closed circuit being connected across the output of said machine on the machine side of said contacts.

References Cited
UNITED STATES PATENTS 3,062,998 11/1962 Medlar _____ 320—25 X
3,219,903 11/1963 Larson _____ 320—25 X
2,766,418 10/1956 Rice _____ 320—25

MILTON O. HIRSHFIELD, *Primary Examiner.*

J. D. TRAMMELL, *Assistant Examiner.*